United States Patent [19]

Kowalski

[11] Patent Number: 4,634,327
[45] Date of Patent: Jan. 6, 1987

[54] FASTENING DEVICE FOR ATTACHMENT TO A THREADED ROD

[75] Inventor: Joseph W. Kowalski, Highland, Ill.
[73] Assignee: B-Line Systems, Inc., Highland, Ill.
[21] Appl. No.: 812,010
[22] Filed: Dec. 23, 1985
[51] Int. Cl.$^4$ ............................................. F16B 37/08
[52] U.S. Cl. .................................... 411/432; 411/546
[58] Field of Search ............... 411/432, 427, 433, 546, 411/437

[56] References Cited

U.S. PATENT DOCUMENTS

| | | | |
|---|---|---|---|
| 2,066,541 | 1/1937 | Schenk | 411/437 |
| 2,355,679 | 8/1944 | Roxs et al. | 85/32 |
| 2,374,309 | 4/1945 | Roxs | 85/32 |
| 3,343,440 | 9/1967 | Jones et al. | 85/33 |
| 3,675,530 | 7/1972 | Victor | 85/33 |
| 3,878,757 | 4/1975 | Puklus, Jr. | 85/32 V |
| 4,048,897 | 9/1977 | Price, Jr. | 85/33 |
| 4,285,264 | 8/1981 | Einhorn | 411/437 X |

FOREIGN PATENT DOCUMENTS

| | | | |
|---|---|---|---|
| 453654 | 6/1968 | Switzerland | 411/437 |
| 787657 | 12/1957 | United Kingdom | 411/427 |

Primary Examiner—Gary L. Smith
Assistant Examiner—Adrian H. Whitcomb, Jr.
Attorney, Agent, or Firm—Senniger, Powers, Leavitt and Roedel

[57] ABSTRACT

A fastening device adapted for quick attachment to a threaded rod at any point along the length of the rod, comprising a fastening element having a web and first and second generally flat flanges extending outwardly from the web in spaced-apart substantially parallel relation. Each flange has opposite side edges and an outer edge opposite the web. A pair of recesses extend inwardly from respective side edges of the flanges at opposite sides of the fastening element, the recesses having rounded generally concentric inner edges threaded to mate with the threads of the threaded rod. A retainer is provided for retaining the inner edges in threaded engagement with the rod. The fastening device is attached to a vertical threaded rod by moving the fastening element to a position in which the first and second flanges lie in generally vertical planes with the threaded rod disposed between the flanges and in general alignment with the recesses, rotating the fastening element to bring the rod into the recesses and the threaded inner edges of the recesses into mating engagement with the threads of the rod, and assembling the retainer with the fastener element to retain the threaded recess edges in engagement with the threaded rod.

14 Claims, 12 Drawing Figures

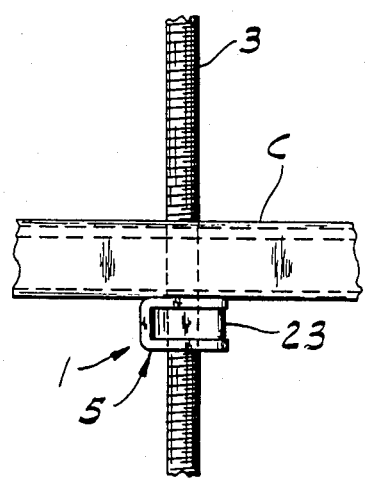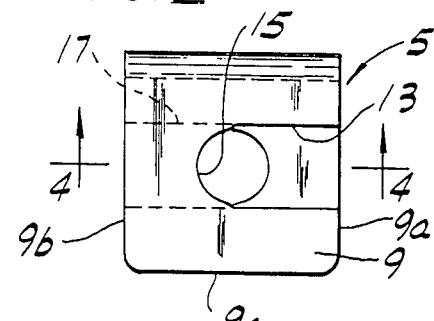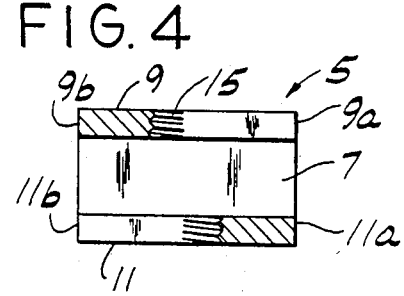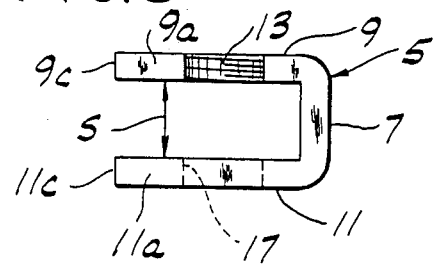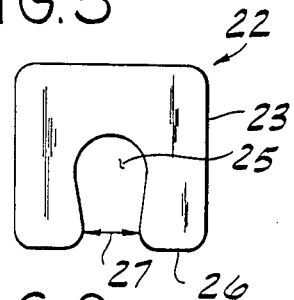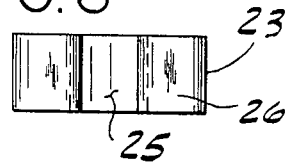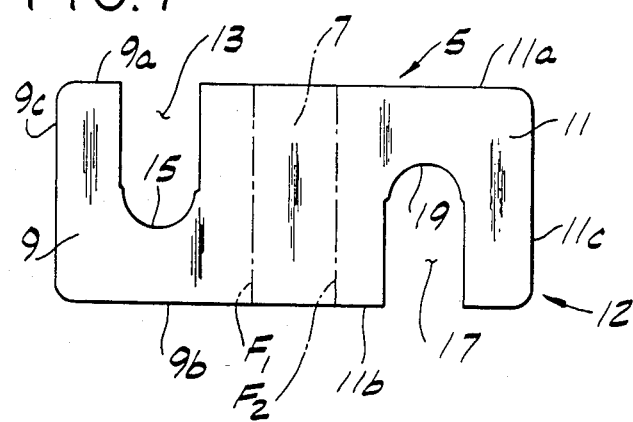

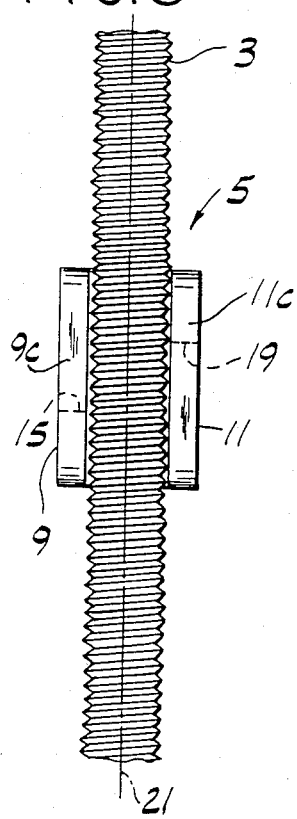
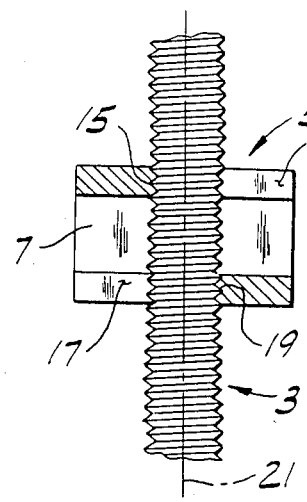
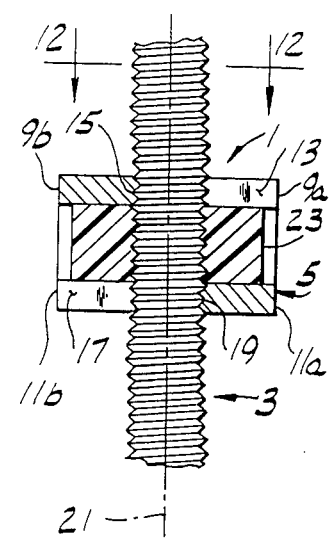
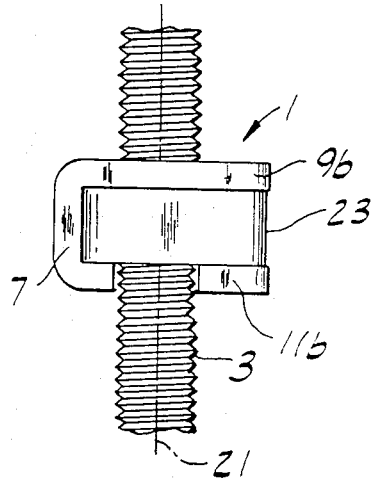
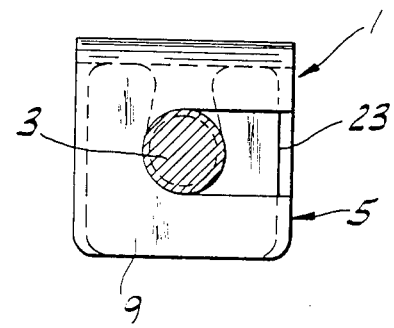

FASTENING DEVICE FOR ATTACHMENT TO A THREADED ROD

BACKGROUND OF THE INVENTION

This invention relates generally to a device to be attached to a threaded rod, and more particularly to a fastening device adapted for quick attachment to a threaded rod at any point along the length of the rod.

Conventional nuts threaded on vertical rods are typically used to support conduit-carrying channels and the like at desired elevations. However, the use of such nuts has a serious drawback in that threading the nuts up on the rods (which are usually quite long-e.g., 12 feet) can be quite time-consuming and thus costly in terms of labor.

Reference may be made to U.S. Pat. Nos. 2,355,679, 2,374,309, 3,343,440, 3,675,530, 3,878,757 and 4,048,897 for various fastening devices generally in the field of this invention.

SUMMARY OF THE INVENTION

Among the several objects of this invention is the provision of a fastening device which can be attached at any point along a threaded rod quickly, easily and economically; the provisions of such a device having superior strength characteristics; and the provision of such a device which is relatively inexpensive to fabricate.

Generally, a fastening device of the present invention is adapted for quick attachment to a threaded rod at any point along the length of the rod. It comprises a fastening element having a web with first and second generally flat flanges extending outwardly from the web in spaced-apart substantially parallel relation. Each flange has opposite side edges and an outer edge opposite the web. The first flange has a recess extending inwardly from one of its side edges at one side of the fastening element, said recess having a rounded inner edge threaded to mate with the threads at one side of the threaded rod. The second flange has a recess extending inwardly from one of its side edges at the opposite side of the fastening element, said recess in the second flange having a rounded inner edge concentrically disposed with respect to the rounded inner edge of the recess in the first flange and threaded to mate with the threads of the rod at the side of the rod opposite its said one side.

The fastening device is adapted to be attached to a vertical threaded rod by moving the fastening element to a position in which the first and second flanges lie in generally vertical planes with the threaded rod disposed between the flanges and in general alignment with said recesses. The fastening element is then rotated to bring the rod into the recesses and the threaded inner edges of the recesses into mating engagement with the threads of the rod. The fastening device further comprises retainer means for retaining the threaded recess edges in engagement with the threaded rod.

In another aspect of this invention, the above described fastening device is claimed in combination with a threaded rod.

Other objects and features will be in part apparent and in part pointed out hereinafter.

BRIEF DESCRIPTION OF THE DRAWINGS

FIG. 1 is a side elevation showing a fastening device of the present invention attached to a threaded rod and supporting a channel thereon;

FIG. 2 is a top plan view of a fastening element of the fastening device;

FIG. 3 is a side view of the fastening element;

FIG. 4 is a sectional view of the fastening element taken on line 4—4 of FIG. 2;

FIG. 5 is a plan view of a retainer;

FIG. 6 is a front view of the retainer;

FIG. 7 is a flat pattern of the fastening element;

FIGS. 8-10 are views illustrating the attachment of the fastening device to a threaded rod;

FIG. 11 is a side view of the fastening device attached to a threaded rod; and

FIG. 12 is a sectional view taken on line 12—12 of Fig. 10:

Corresponding reference characters indicate corresponding parts throughout the several views of the drawings.

DESCRIPTION OF THE PREFERRED EMBODIMENT

Referring now to the drawings, a fastening device of the present invention is generally designated by the reference numeral 1. As shown in FIG. 1, the device is especially useful for supporting a channel C or the like on a threaded rod 3, although it will be understood that the device may have other applications.

As illustrated in FIGS. 2-4 and FIG. 7, the fastening device comprises a fastening element 5 having a web 7 and first and second generally flat flanges, designated as 9, 11, respectively, extending outwardly from the web in spaced-apart substantially parallel relation. The spacing S between flanges 9 and 11 is only slightly greater than the diameter of rod 3. As shown in FIG. 7, the fastening element is preferably formed from a rectangular flat metal plate, generally designated 12, bent on two fold lines (F1, F2) extending transversely with respect to the plate and spaced apart a distance equal to the width of the web.

Each flange 9, 11 has opposite side edges 9a, 9b, and 11a, 11b, respectively, and outer edges 9c, 11c opposite the web. The first flange 9 has a recess in the form of a slot 13 extending inwardly from one side edge 9a at one side of the fastening element toward opposite side edge 9b. The slot 13 has a rounded inner edge 15 threaded to mate with the threads at one side of threaded rod 3. The second flange 11 has a recess in the form of a slot 17 extending inwardly from side edge 11b at the opposite side of the fastening element toward side edge 11a, the slot 17 having a rounded inner edge 19 generally concentrically disposed with respect to the rounded inner edge 15 of the slot 13 in the first flange and threaded to mate with the threads of the rod 3 at the side of the rod opposite the side mated with inner edge 15. Each slot 13, 17 has a width approximately equal to the diameter of rod 3.

The fastening device is readily adapted to be attached to a vertical threaded rod (e.g., rod 3) at any desired position along the length of the rod by moving the fastening element 5 to a position (FIG. 8) in which the first and second flanges 9, 11 lie in generally vertical planes with the threaded rod disposed between the flanges and in general alignment with slots 13 and 17. The fastening element is then rotated to a position in which the flanges lie in horizontal planes perpendicular to the longitudinal axis 21 of rod 3 (FIG. 9) to bring the rod into the slots and the threaded inner edges 15 and 19 of the slots into mating engagement with the threads of the rod.

The present invention further includes retainer means, generally indicated at 22, for retaining the threaded slot edges 15, 19 in engagement with the threaded rod. As shown best in FIGS. 5 and 6, retaining means 22 comprises a generally square retaining member or block 23 having a thickness approximately equal to the spacing S between the flanges 9, 11 of the fastening element 5. Retaining member 23 has a recess in the form of a slot 25 extending inwardly from one edge 26 for receiving the rod. The retaining member, as shown in FIGS. 10–12, is adapted to be inserted between the flanges 9, 11 of the fastening element 5 when the fastening element is attached to the rod. The retaining member is inserted between the flanges to a position where the rod 3 is received in the slot 25 thereby to prevent the fastening element from rotating out of threaded engagement with the rod. In addition to ensuring that the fastening element 5 remains in threaded engagement with the rod, the retaining member also increases the capacity of flanges 9 and 11 to withstand vertical loads without bending.

The slot 25 in the retaining member has a mouth 27 with a width less than the diameter of the rod. The retaining member is manufactured of resilient material (e.g., a suitable relatively hard plastic preferably having a shore A diameter of greater than 100) for enabling the mouth of the slot to widen to permit entry of the rod into and through the mouth, whereupon the mouth returns to its undeformed state in order to maintain the rod in the slot and thus the retaining member in proper position with respect to the fastening element.

In view of the above, it will be seen that the several objects of the invention are achieved and other advantageous results attained. More specifically, it will be apparent that the fastening device of this invention can be quickly and easily attached to a threaded rod at any position along the rod without the need for threading the device along the rod, as in the case of conventional nuts. Thus, the fastening device 1 reduces to a considerable extent the time required to install channels C and the like.

As various changes could be made in the above constructions without departing from the scope of the invention, it is intended that all matter contained in the above description as shown in the accompanying drawings shall be interpreted as illustrative and not in a limiting sense.

What is claimed is:

1. A fastening device adapted for quick attachment to a threaded rod at any point along the length of the rod, comprising a fastening element having a web, first and second generally flat flanges extending outwardly from the web in spaced-apart substantially parallel relation, each flange having opposite side edges and an outer edge opposite the web, the first flange having a recess extending inwardly from one of its side edges at one side of the element, said recess having a rounded inner edge threaded to mate with the threads at one side of said threaded rod, the second flange having a recess extending inwardly from one of its side edges at the opposite side of the element, said recess in the second flange having a rounded inner edge generally concentrically disposed with respect to the rounded inner edge of the recess in the first flange and threaded to mate with the threads of said rod at the side of the rod opposite its said one side, and retainer means for retaining the threaded recess edges in engagement with the threaded rod, said fastening device being adapted to be attached to a vertical threaded rod by moving said fastening element to a position in which the first and second flanges lie in generally vertical planes with the threaded rod disposed between the flanges and in general alignment with said recesses, rotating the fastening element to bring the rod into the recesses and the threaded inner edges of the recesses into mating engagement with the threads of the rod, and assembling said retaining means with said fastener element.

2. A fastening device as set forth in claim 1 wherein said retaining means comprises a retaining member having a recess extending inwardly from one edge thereof for receiving said rod therein, said retaining member being adapted to be inserted between the flanges of the fastening element when the latter is attached to the rod to a postion in which the retaining member is between the flanges with the rod received in the recess in the retaining member thereby to prevent the fastening element from rotating out of threaded engagement with the rod.

3. A fastening device as set forth in claim 2 wherein said recess in the retaining member is in the form of a slot having a mouth with a width less than the width of the remainder of the slot and less than the diameter of said rod, said retaining member being of resilient material for enabling the mouth of the slot to widen to permit entry of the rod into and through the mouth of the slot whereupon said mouth is adapted resiliently to return to its undeformed state thereby to maintain the rod in the slot and thus the retaining member in proper position with respect to the fastening element.

4. A fastening device as set forth in claim 2 wherein said retaining member has a thickness approximately equal to the spacing between said flanges.

5. A fastening device as set forth in claim 4 wherein the spacing between said flanges of the fastening element is only slightly greater than the diameter of said rod.

6. A fastening device as set forth in claim 3 wherein the recesses in said flanges are in the form of slots, each having a width approximately equal to the diameter of said rod.

7. A fastening device as set forth in claim 6 wherein said fastening element comprises an elongate flat metal plate bent on two fold lines extending transversely with respect to the plate and spaced apart a distance equal to the width of said web.

8. In combination with a threaded rod, a fastening device adapted for quick attachment to the rod at any point along the length of the rod, comprising a fastening element of having a web, first and second generally flat flanges extending outwardly from the web in spaced-apart substantially parallel relation, each flange having opposite side edges and an outer edge opposite the web, the first flange having a recess extending inwardly from one of its side edges at one side of the element, said recess having a rounded inner edge threaded to mate with the threads at one side of said threaded rod, the second flange having a recess extending inwardly from one of its side edges at the opposite side of the element, said recess in the second flange having a rounded inner edge generally concentrically disposed with respect to the rounded inner edge of the recess in the first flange and threaded to mate with the threads of said rod at the side of the rod opposite said one side, and retainer means retaining the threaded recess edges in engagement with the threaded rod.

9. A combination as set forth in claim 8 wherein said retaining means comprises a retaining member disposed between the flanges of the fastener element having a recess extending inwardly from one edge thereof receiving said rod therein, said retaining member preventing the fastening element from rotating out of threaded engagement with the rod.

10. A combination as set forth in claim 9 wherein said recess in the retaining member is in the form of a slot having a mouth with a width less than the width of the remainder of the slot and less than the diameter of said rod, said retaining member being of resilient material for enabling the mouth of the slot to widen to permit entry of the rod into and through the mouth of the slot whereupon said mouth is adapted resiliently to return to its undeformed state thereby to maintain the rod in the slot and thus the retaining member in proper position with respect to the fastening element.

11. A combination as set forth in claim 9 wherein said retaining member has a thickness approximately equal to the spacing between said flanges.

12. A combination as set forth in claim 11 wherein the spacing between said flanges of the fastening element is only slightly greater than the diameter of said rod.

13. A combination as set forth in claim 12 wherein the recesses in said flanges are in the form of slots, each having a width approximately equal to the diameter of said rod.

14. A combination as set forth in claim 8 wherein said fastening element comprises an elongate flat metal plate bent on two fold lines extending transversely with respect to the plate and spaced apart a distance equal to the width of said web.

* * * * *